US012735528B2

(12) United States Patent
Nam et al.

(10) Patent No.: US 12,735,528 B2
(45) Date of Patent: Sep. 15, 2026

(54) CURING AGENT, ADHESIVE COMPOSITION FOR SEMICONDUCTOR COMPRISING SAME, ADHESIVE FILM FOR SEMICONDUCTOR, AND SEMICONDUCTOR PACKAGE USING SAME

(71) Applicant: LG CHEM, LTD., Seoul (KR)

(72) Inventors: Seung Hee Nam, Daejeon (KR); Kwang Joo Lee, Daejeon (KR); Jung Hak Kim, Daejeon (KR); Eun Byurl Cho, Daejeon (KR); Young Sam Kim, Daejeon (KR)

(73) Assignee: LG CHEM, LTD., Seoul (KR)

( * ) Notice: Subject to any disclaimer, the term of this patent is extended or adjusted under 35 U.S.C. 154(b) by 811 days.

(21) Appl. No.: 17/996,296

(22) PCT Filed: Apr. 16, 2021

(86) PCT No.: PCT/KR2021/004779

§ 371 (c)(1),
(2) Date: Oct. 14, 2022

(87) PCT Pub. No.: WO2021/215745

PCT Pub. Date: Oct. 28, 2021

(65) Prior Publication Data

US 2023/0220153 A1 Jul. 13, 2023

(30) Foreign Application Priority Data

Apr. 24, 2020 (KR) ........................ 10-2020-0050164

(51) Int. Cl.

| | |
|---|---|
| ***C08G 61/02*** | (2006.01) |
| ***C08K 3/36*** | (2006.01) |
| ***C08K 5/07*** | (2006.01) |
| ***C08K 5/3445*** | (2006.01) |
| ***C09J 11/08*** | (2006.01) |
| ***C09J 163/00*** | (2006.01) |

(52) U.S. Cl.

CPC ................ *C08G 61/02* (2013.01); *C08K 3/36* (2013.01); *C08K 5/07* (2013.01); *C08K 5/3445* (2013.01); *C09J 11/08* (2013.01); *C09J 163/00* (2013.01); *C08G 2170/00* (2013.01); *C08K 2201/003* (2013.01); *C09J 2203/326* (2013.01); *C09J 2301/408* (2020.08); *C09J 2463/00* (2013.01)

(58) Field of Classification Search

CPC ...... C08G 61/02; C08G 2170/00; C08K 3/36; C08K 5/07; C08K 5/3445; C08K 2201/003; C09J 11/08; C09J 163/00; C09J 2301/408; C09J 2203/326; C09J 2463/00

USPC ........................................................... 528/86

See application file for complete search history.

(56) References Cited

U.S. PATENT DOCUMENTS

| | | | | |
|---|---|---|---|---|
| 4,474,929 | A | 10/1984 | Schrader | |
| 5,859,153 | A * | 1/1999 | Kirk | C08G 8/12 525/484 |
| 6,103,000 | A * | 8/2000 | Custer | C08L 95/005 106/235 |
| 9,684,239 | B2 * | 6/2017 | Imaizumi | G03F 7/0755 |
| 2009/0230568 | A1 | 9/2009 | Yasuda et al. | |
| 2014/0179835 | A1 | 6/2014 | Kim et al. | |
| 2016/0093547 | A1 | 3/2016 | Kim et al. | |
| 2017/0198182 | A1 | 7/2017 | Kim et al. | |
| 2018/0237667 | A1 | 8/2018 | Kim et al. | |
| 2020/0362209 | A1 | 11/2020 | Jang et al. | |

FOREIGN PATENT DOCUMENTS

| | | | |
|---|---|---|---|
| CN | 101641773 | A | 2/2010 |
| CN | 103897344 | A | 7/2014 |
| CN | 106189099 | A | 12/2016 |
| CN | 106414641 | A | 2/2017 |
| CN | 106459719 | A | 2/2017 |
| CN | 111417695 | A | 7/2020 |
| JP | S61500024 | A | 1/1986 |
| JP | S61138614 | A | 6/1986 |
| JP | 62-263137 | A | 11/1987 |
| JP | H05222336 | A | 8/1993 |
| JP | H06264035 | A | 9/1994 |
| JP | H7-301915 | A | 11/1995 |
| JP | H07316380 | A | 12/1995 |
| JP | 2566172 | B2 | 12/1996 |
| JP | 2942291 | B | 8/1999 |
| JP | 2002009446 | A * | 1/2002 |
| JP | 2002145993 | A | 5/2002 |
| JP | 2011-137126 | A | 7/2011 |
| JP | 2018506172 | A | 3/2018 |
| JP | 2019509620 | A | 4/2019 |
| KR | 10-2008-0078922 | A | 8/2008 |

(Continued)

OTHER PUBLICATIONS

Hosoki et al., JP 2002-009446 A machine translation in English, Jan. 11, 2002. (Year: 2002).*

Lin-Gibson et al., "Controlled molecular weight cresol-formaldehyde oligomers", Polymer, 2002, vol. 43, p. 2017-2029, (Year: 2002).*

(Continued)

*Primary Examiner* — David T Karst

(74) *Attorney, Agent, or Firm* — ROTHWELL, FIGG, ERNST & MANBECK, P.C.

(57) ABSTRACT

The present disclosure relates to a curing agent, an adhesive composition for a semiconductor device containing the curing agent, the adhesive composition exhibiting excellent adhesive strength and having excellent reliability because of being inhibited from cracking, an adhesive film for a semiconductor device, and a semiconductor package including the same.

19 Claims, No Drawings

(56) References Cited

FOREIGN PATENT DOCUMENTS

| | | | |
|---|---|---|---|
| KR | 10-2009-0060804 | A | 6/2009 |
| KR | 10-1472221 | B | 12/2014 |
| KR | 10-2015-0127294 | A | 11/2015 |
| KR | 10-2018-0076899 | A | 7/2018 |
| KR | 10-2019-0121252 | A | 10/2019 |

OTHER PUBLICATIONS

Bogan, "The Novolak Synthesis Reaction: A Description Based on Reactivities", Macromolecules, 1992, vol. 25, p. 1966-1969. (Year: 1992).*

International Search Report issued for International Application No. PCT/KR2021/004779 on Jul. 30, 20201, 4 pages.

* cited by examiner

CURING AGENT, ADHESIVE COMPOSITION FOR SEMICONDUCTOR COMPRISING SAME, ADHESIVE FILM FOR SEMICONDUCTOR, AND SEMICONDUCTOR PACKAGE USING SAME

TECHNICAL FIELD

This application is a 35 U.S.C. 371 National Phase Entry Application from PCT/KR2021/004779 filed on Apr. 16, 2021, which claims the benefit of the filing date of Korean Patent Application No. 10-2020-0050164 filed with the Korean Intellectual Property Office on Apr. 24, 2020, the entire contents of which are incorporated herein by reference.

The present disclosure relates to a curing agent, an adhesive composition for a semiconductor device containing the same, an adhesive film for a semiconductor device, and a semiconductor package including the same.

BACKGROUND OF THE INVENTION

In recent years, with a growing tendency towards miniaturization, high performance and large capacity of electronic devices, the demand for high density and high integration of semiconductor packages has rapidly increased. Hence, the sizes of semiconductor chips have increased more and more, and in order to improve the degree of integration, a stack package method of stacking chips in multiple stages has been increasingly used.

Bonding between chips by a through-silicon via (TSV) is performed by a thermal compression bonding method of applying pressure thereto at a temperature of 200 to 300° C. for 2 to 10 seconds. As an adhesive to fill between TSV layers, a non-conductive paste (NCP) or a non-conductive film (NCF) has been used, and in order to ensure thermal expansion coefficient and rigidity and prevent cracking, a filler dispersed in epoxy or bismaleimide resin has been used. However, the adhesive has problems in that it is vulnerable to sudden changes in temperature and pressure during the thermal compression bonding process, and hence the filler is separated from the resin to form a region in which the filler does not exist in the resin, and for this reason, cracks occur in the semiconductor package. In particular, the conventional adhesive includes Bisphenol A (BPA) as a curing agent, but the BPA curing agent has a problem in that it is vulnerable to cracks.

Accordingly, there is a need for a technology related to an adhesive composition for a semiconductor device having excellent reliability because of being inhibited from cracking that occurs due to sudden changes in pressure and temperature during the thermal compression bonding process.

BRIEF SUMMARY OF INVENTION

The present disclosure is intended to provide a curing agent capable of inhibiting cracking while exhibiting excellent adhesive strength, an adhesive composition for a semiconductor device containing the curing agent, an adhesive film for a semiconductor device, and a semiconductor package including the same.

However, the problem to be solved by the present disclosure is not limited to the above-mentioned problem, and other problems not mentioned herein will be clearly understood by those skilled in the art from the following description.

One embodiment of the present disclosure provides a curing agent including at least one of a compound represented by the following Formula 1 and a compound represented by the following Formula 2:

[Formula 1]

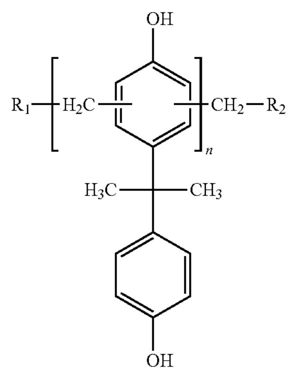

[Formula 2]

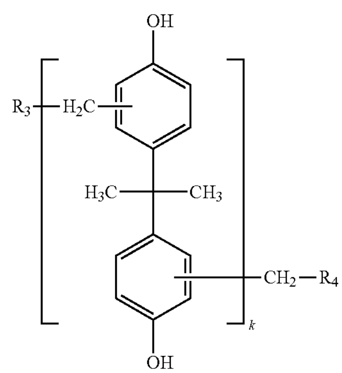

wherein $R_1$, $R_2$, $R_3$ and $R_4$ are each independently a phenolic compound, n is an integer ranging from 1 to 50, and k is an integer ranging from 1 to 50.

Another embodiment of the present disclosure provides an adhesive composition for a semiconductor device containing: a thermosetting resin; a thermoplastic resin; and a curing agent including at least one of a compound represented by the following Formula 1 and a compound represented by the following Formula 2:

[Formula 1]

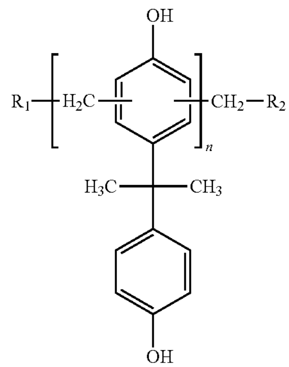

-continued

[Formula 2]

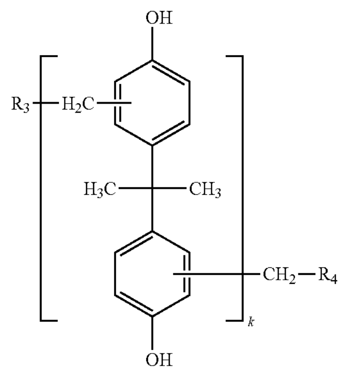

wherein $R_1$, $R_2$, $R_3$ and $R_4$ are each independently a phenolic compound, n is an integer ranging from 1 to 50, and k is an integer ranging from 1 to 50.

Still another embodiment of the present disclosure provides an adhesive film for a semiconductor device including a cured product of the adhesive composition for a semiconductor device.

Yet another embodiment of the present disclosure provides a semiconductor package including the adhesive film for a semiconductor device.

Advantageous Effects

Using the curing agent according to one embodiment of the present disclosure, it is possible to provide an adhesive composition which is inhibited from cracking while exhibiting excellent adhesive strength.

The adhesive composition for a semiconductor device according to one embodiment of the present disclosure may be inhibited from cracking while exhibiting excellent adhesive strength.

The adhesive film for a semiconductor device according to one embodiment of the present disclosure may have excellent adhesive strength and may be effectively inhibited from cracking during a thermal compression bonding process.

The semiconductor package according to one embodiment of the present disclosure may have excellent quality.

Effects of the present disclosure are not limited to the above-described effects, and effects not mentioned herein will be clearly understood by those skilled in the art from the present specification and the accompanying drawings.

DETAILED DESCRIPTION OF INVENTION

Throughout the present specification, it is to be understood that when any part is referred to as "including" any component, it does not exclude other components, but may further include other components, unless otherwise specified.

Throughout the present specification, when any member is referred to as being "on" another member, it not only refers to a case where any member is in contact with another member, but also a case where a third member exists between the two members.

Throughout the present specification, the unit "parts by weight" may refer to the ratio of weight between components.

Hereinafter, the present specification will be described in more detail

One embodiment of the present disclosure provides a curing agent including at least one of a compound represented by the following Formula 1 and a compound represented by the following Formula 2:

[Formula 1]

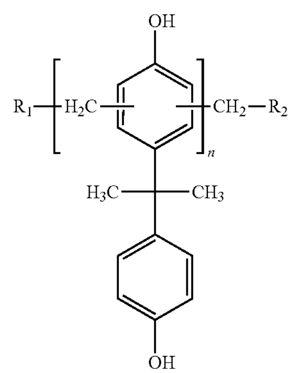

[Formula 2]

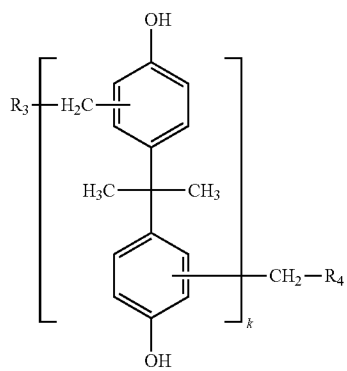

wherein $R_1$, $R_2$, $R_3$ and $R_4$ are each independently a phenolic compound, n is an integer ranging from 1 to 50, and k is an integer ranging from 1 to 50.

Using the curing agent according to one embodiment of the present disclosure, it is possible to provide an adhesive composition which is inhibited from cracking while exhibiting excellent adhesive strength.

According to one embodiment of the present disclosure, the compound represented by Formula 1 may be end-capped with $R_1$ and $R_2$. $R_1$ and $R_2$ may be each independently a phenolic compound. Where $R_1$ and $R_2$ are each independently a phenolic compound, the hardness of the curing agent itself may be reduced. Thereby, a cured product of an adhesive composition containing the curing agent may have increased softness, and thus it is possible to obtain an adhesive film having excellent crack resistance, which is inhibited from cracking while having excellent adhesive performance. In addition, as the adhesive film has improved crack resistance, it may also exhibit excellent performance in terms of reliability.

In addition, $R_1$ and $R_2$ may be the same as each other. That is, the same phenolic compounds may be bonded to both ends of Formula 1, and the compound represented by Formula 1 may have improved dispersibility.

According to one embodiment of the present disclosure, n in Formula 1 may be an integer ranging from 1 to 50, specifically an integer ranging from 1 to 45, an integer ranging from 5 to 40, an integer ranging from 10 to 35, an integer ranging from 15 to 30, an integer ranging from 20 to 25, an integer ranging from 1 to 20, an integer ranging from 2 to 15, an integer ranging from 3 to 10, an integer ranging from 4 to 7, an integer ranging from 15 to 40, an integer ranging from 20 to 35, an integer ranging from 25 to 30, an integer ranging from 30 to 50, or an integer ranging from 35 to 45. Wherein n in Formula 1 is within the above-described range, the compound represented by Formula 1 may have excellent curing performance.

According to one embodiment of the present disclosure, the compound represented by Formula 1 may include at least one of compounds represented by the following Formulas 1-1 to 1-4:

[Formula 1-1]

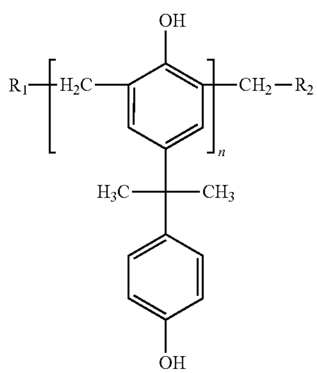

[Formula 1-2]

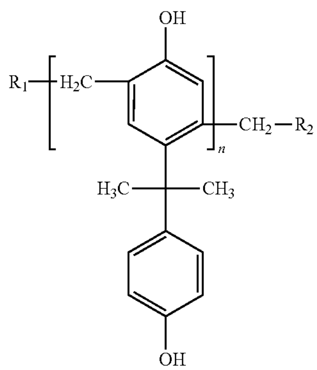

[Formula 1-3]

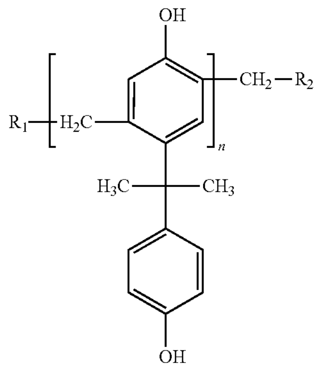

-continued

[Formula 1-4]

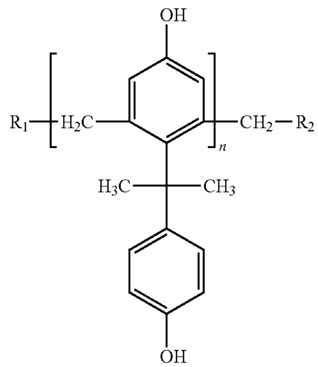

wherein $R_1$, and $R_2$ are each independently a phenolic compound, and n is an integer ranging from 1 to 50.

Specifically, the compound represented by Formula 1 may be the compound represented by Formula 1-1. The compound having the structure represented by Formula 1-1 may effectively reduce the hardness of a cured product of the adhesive composition, which contains the curing agent, while having excellent curing performance.

According to one embodiment of the present disclosure, the compound represented by Formula 2 may be end-capped with $R_3$ and $R_4$. $R_3$ and $R_4$ may be each independently a phenolic compound. Where $R_3$ and $R_4$ are each independently a phenolic compound, the hardness of the curing agent itself may be reduced, so that a cured product of an adhesive composition containing the curing agent may have increased softness. Thereby, the adhesive composition may provide an adhesive film having excellent adhesive performance and excellent crack resistance.

In addition, $R_3$ and $R_4$ may be the same as each other. That is, the same phenolic compounds may be bonded to both ends of Formula 2 above, and the compound represented by Formula 2 may have improved dispersibility.

According to one embodiment of the present disclosure, kin Formula 2 may be an integer ranging from 1 to 50, specifically an integer ranging from 1 to 45, an integer ranging from 5 to 40, an integer ranging from 10 to 35, an integer ranging from 15 to 30, an integer ranging from 20 to 25, an integer ranging from 1 to 20, an integer ranging from 2 to 15, an integer ranging from 3 to 10, an integer ranging from 4 to 7, an integer ranging from 15 to 40, an integer ranging from 20 to 35, an integer ranging from 25 to 30, an integer ranging from 30 to 50, or an integer ranging from 35 to 45. Wherein k in Formula 2 is within the above-described range, the compound represented by Formula 2 may have excellent curing performance.

According to one embodiment of the present disclosure, the compound represented by Formula 2 may include at least one of compounds represented by the following Formulas 2-1 to 2-4:

[Formula 2-1]

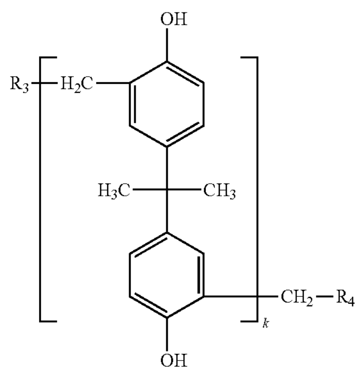

[Formula 2-2]

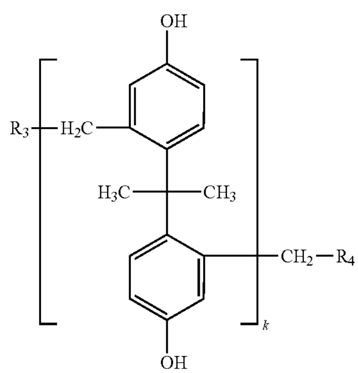

[Formula 2-3]

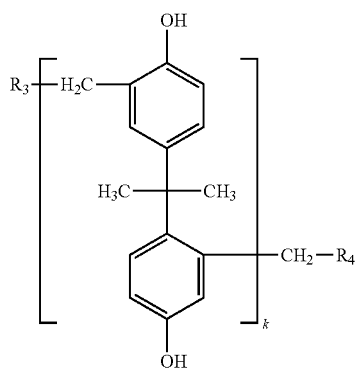

[Formula 2-4]

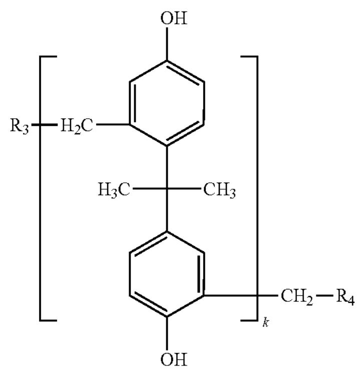

wherein $R_3$ and $R_4$ are each independently a phenolic structure, and k is an integer ranging from 1 to 50.

Specifically, the compound represented by Formula 2 may be the compound represented by Formula 2-1. The compound having the structure represented by Formula 2-1 may effectively reduce the hardness of a cured product of the adhesive composition, which contains the curing agent, while having excellent curing performance.

According to one embodiment of the present disclosure, the curing agent may at least include the compound represented by Formula 2-1. As described above, the compound having the structure represented by Formula 2-1 may effectively reduce the hardness of a cured product of the adhesive composition while having excellent curing performance, thereby effectively improving the crack resistance and reliability of the adhesive film.

According to one embodiment of the present disclosure, the curing agent may at least include the compound represented by Formula 1-1 and the compound represented by Formula 2-1. As described above, the compound represented by Formula 1-1 and the compound represented by Formula 2-1 may effectively reduce the hardness of a cured product of the adhesive composition containing the curing agent, while having excellent curing performance.

According to one embodiment of the present disclosure, the phenolic compound may be monocyclic. That is, $R_1$, $R_2$, $R_3$ and $R_4$ may each independently be a monocyclic phenolic compound. Where $R_1$, $R_2$, $R_3$ and $R_4$ are each independently a monocyclic phenolic compound, the hardness of each of the compound represented by Formula 1 and the compound represented by Formula 2 may be effectively reduced. That is, the adhesive composition containing the curing agent may effectively inhibit cracking that may occur during a thermal compression bonding process, while having excellent adhesive strength.

According to one embodiment of the present disclosure, the phenolic compound may be a phenol group unsubstituted or substituted with at least one of a linear or branched alkyl group having 1 to 10 carbon atoms and an alicyclic alkyl group having 4 to 10 carbon atoms. Specifically, the phenolic compound may be an unsubstituted phenol group. Alternatively, the phenolic compound may be a phenol group substituted with at least one alkyl group. Specifically, the phenolic compound may be a phenol group substituted with at least one of a linear or branched aliphatic alkyl group and an alicyclic alkyl group.

As the above-described kind of phenolic compound is bonded to each of the ends of the compound represented by Formula 1 and the compound represented by Formula 2, the compound represented by Formula 1 and the compound represented by Formula 2 may exhibit excellent curing performance while having appropriate softness.

According to one embodiment of the present disclosure, the number of carbon atoms in the linear or branched alkyl group as a substituent of the phenol group may be 1 to 10, 1 to 8, 1 to 6, 1 to 5, 1 to 4, 1 to 3, 1 to 2, 2 to 4, 3 to 5, or 4 to 6. Where the number of carbon atoms in the linear or branched alkyl group is within the above-described range, the hardness of each of the compound represented by Formula 1 and the compound represented by Formula 2 may be effectively reduced. The linear or branched alkyl group may be methyl, ethyl, n-propyl, isopropyl, n-butyl, 2-methylpropyl, n-pentyl, 2-methylbutyl, 3-methylbutyl, 2-ethylpropyl, n-hexyl, 2-methylpentyl, 3-methylpentyl, 4-methylpentyl or 2-ethylbutyl, but the type of the alkyl group is not limited thereto.

According to one embodiment of the present disclosure, the number of carbon atoms in the alicyclic alkyl group as a substituent of the phenol group may be 4 to 10, 4 to 8, 5 to 8, or 6 to 8. Where the number of carbon atoms in the alicyclic alkyl group is within the above-described range, the hardness of each of the compound represented by Formula 1 and the compound represented by Formula 2 may be effectively reduced. The alicyclic alkyl group may be cyclobutyl, cyclopentyl, cyclohexyl, cycloheptyl, or cyclooctyl, but the type of the alkyl group is not limited thereto.

According to one embodiment of the present disclosure, the number of the alkyl groups as substituents of the phenol group may be 1 to 3, or 1 or 2. Where the number of the alkyl groups as substituents of the phenol group is within the above-described range, the softness of the curing agent may be effectively increased while the curing performance of the curing agent is prevented from deteriorating.

According to one embodiment of the present disclosure, the phenolic compound may be any one of the following compounds:

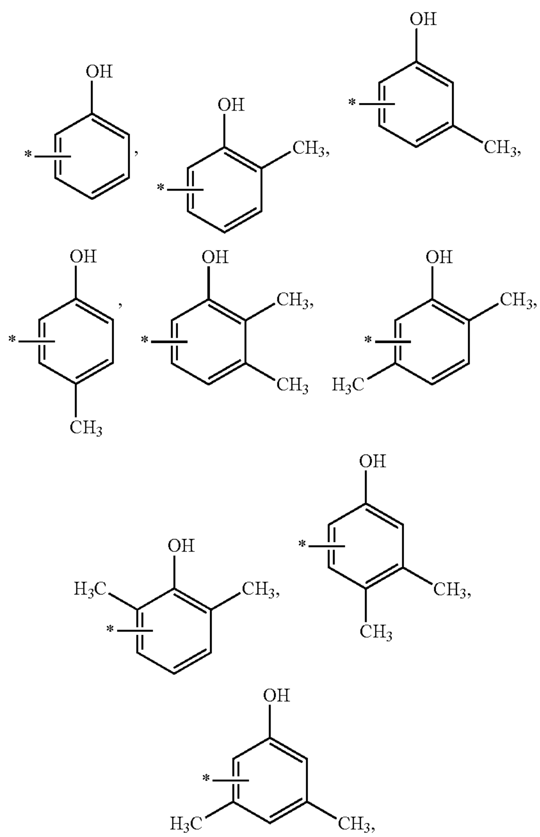

Specifically, the phenolic compound may be any one of the following compounds:

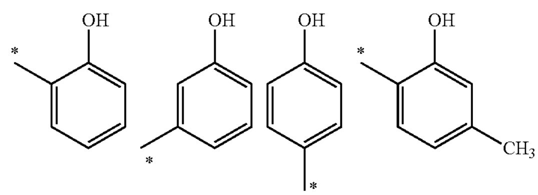

-continued

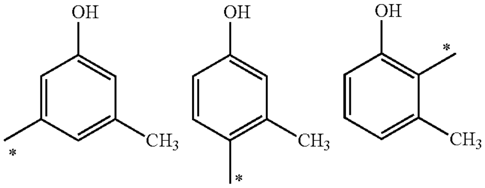

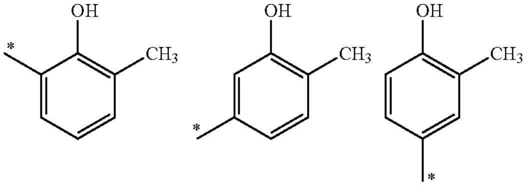

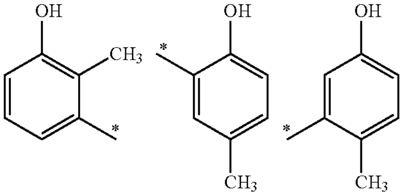

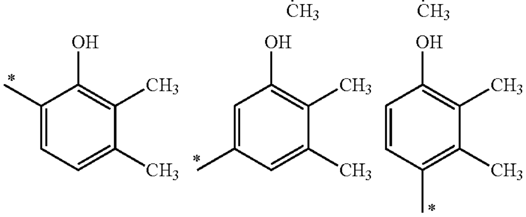

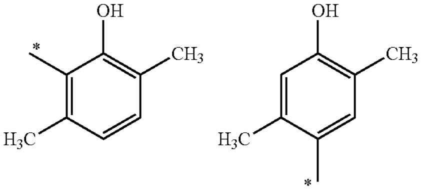

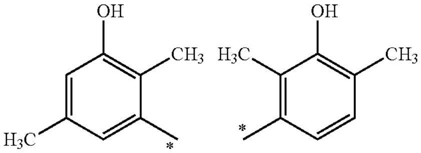

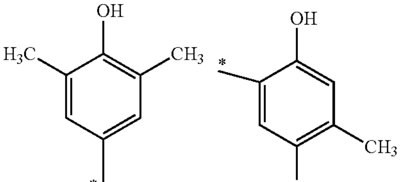

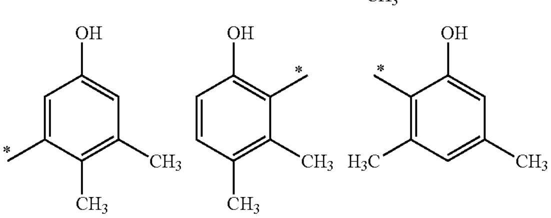

-continued

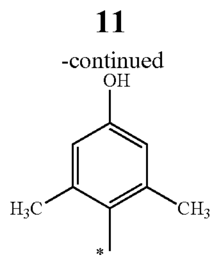

wherein "*" refers to a bonding site.

Where the phenolic compound is any one of the above compounds, the hardness of each of the compound represented by Formula 1 and the compound represented by Formula 2 may be effectively reduced while the excellent curing performance thereof is maintained. Thereby, the adhesive composition containing the curing agent may provide an adhesive film having excellent adhesive performance and crack resistance.

According to one embodiment of the present disclosure, the compound represented by Formula 1 may include at least one of a compound represented by the following Formula 1-A and a compound represented by the following Formula 1-B:

[Formula 1-A]

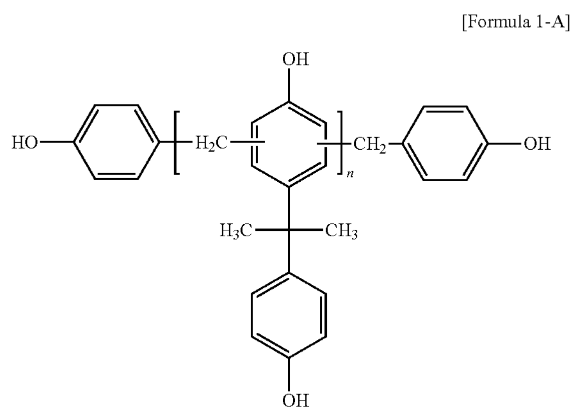

[Formula 1-B]

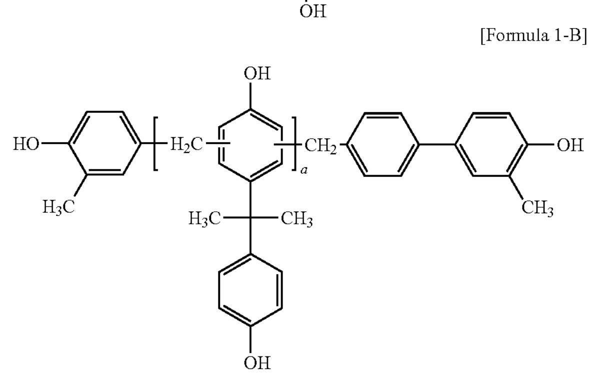

wherein n is an integer ranging from 1 to 50.

The hardness of each of the compound represented by Formula 1-A and the compound represented by Formula 1-B may be effectively reduced, so that an adhesive composition containing the curing agent may have improved crack resistance and may have curing performance capable of achieving excellent mechanical properties.

According to one embodiment of the present disclosure, the compound represented by Formula 1-A may include the following compound 1-A-1, and the compound represented by Formula 1-B may include the following compound 1-B-1:

[Compound 1-A-1]

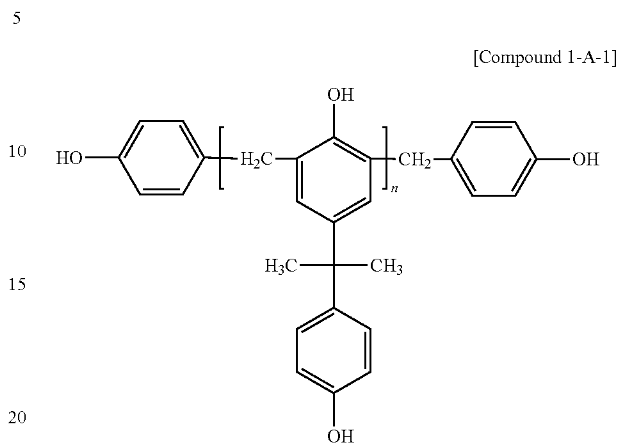

[Compound 1-B-1]

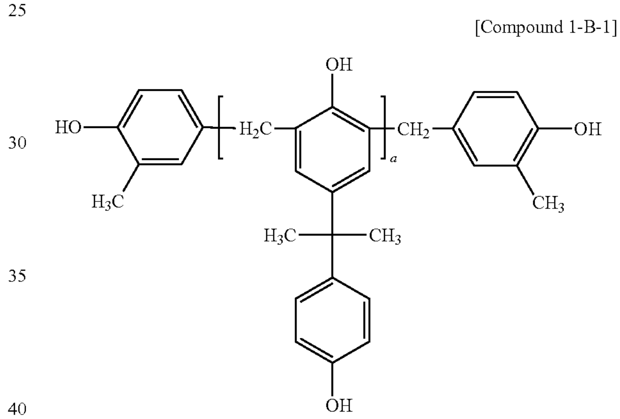

wherein n is an integer ranging from 1 to 50.

According to one embodiment of the present disclosure, the compound represented by Formula 2 may include at least one of a compound represented by the following Formula 2-A and a compound represented by the following Formula 2-B:

[Formula 2-A]

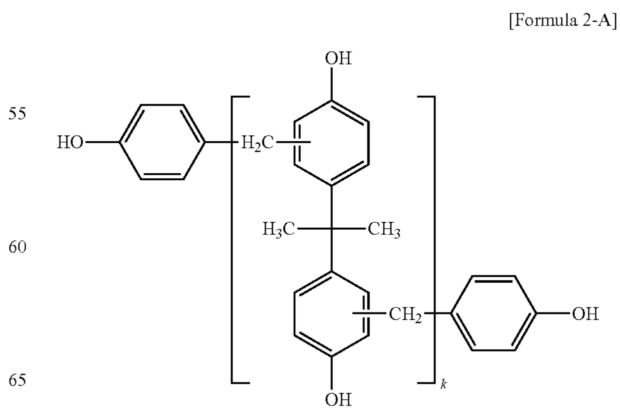

-continued

[Formula 2-B]

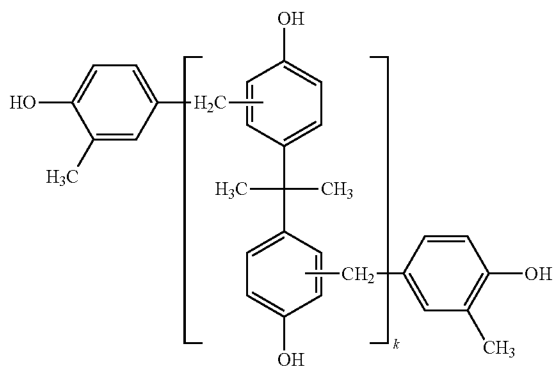

wherein k is an integer ranging from 1 to 50.

The adhesive composition containing the compound represented by Formula 2-A and the compound represented by Formula 2-B may provide an adhesive film having excellent adhesive performance and crack resistance.

According to one embodiment of the present disclosure, the compound represented by Formula 2-A may include the following compound 2-A-1, and the compound represented by Formula 2-B may include the following compound 2-B-1:

[Compound 2-A-1]

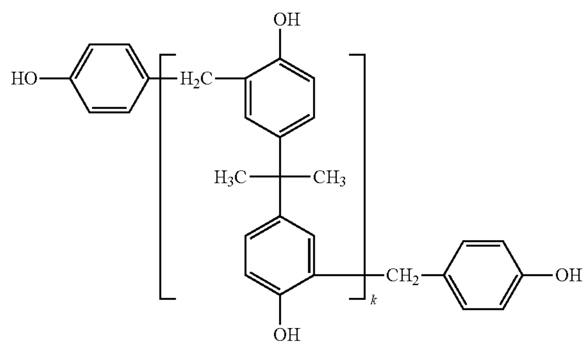

[Compound 2-B-1]

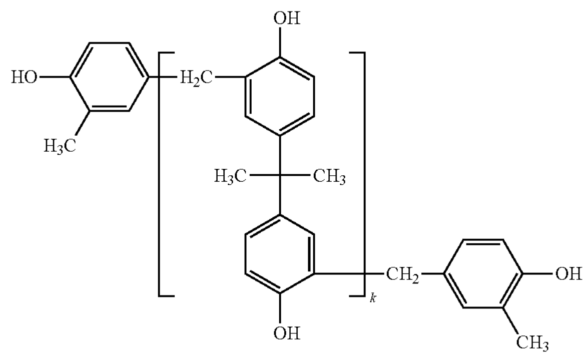

wherein n is an integer ranging from 1 to 50.

One embodiment of the present disclosure provides an adhesive composition for a semiconductor device containing: a thermosetting resin; a thermoplastic resin; and a curing agent including at least one of a compound represented by the following Formula 1 and a compound represented by the following Formula 2:

[Formula 1]

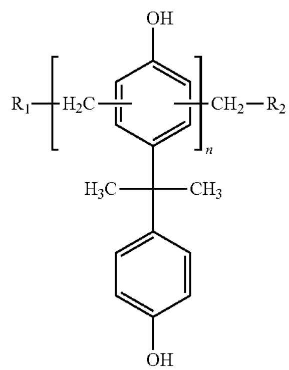

[Formula 2]

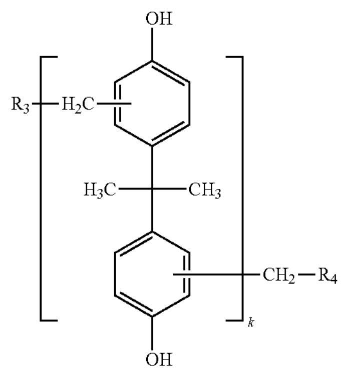

wherein $R_1$, $R_2$, $R_3$ and $R_4$ are each independently a phenolic compound, n is an integer ranging from 1 to 50, and k is an integer ranging from 1 to 50.

The adhesive composition for a semiconductor device according to one embodiment of the present disclosure may be inhibited from cracking while exhibiting excellent adhesive strength. Specifically, as the adhesive composition for a semiconductor device according to one embodiment of the present disclosure contains the curing agent including at least one of the compound represented by Formula 1 and the compound represented by Formula 2, it may be effectively inhibited from cracking that may occur during a thermal compression bonding process, while having excellent adhesive strength.

According to one embodiment of the present disclosure, the compound represented by Formula 1 may be end-capped with $R_1$ and $R_2$. $R_1$ and $R_2$ may be each independently a phenolic compound. Where $R_1$ and $R_2$ are each independently a phenolic compound, the hardness of the curing agent itself may be reduced. Thereby, a cured product of the adhesive composition for a semiconductor device containing the curing agent may have increased softness, and thus it is possible to obtain an adhesive film having excellent crack resistance, which is inhibited from cracking while having excellent adhesive performance. In addition, as the adhesive film has improved crack resistance, it may also exhibit excellent performance in terms of reliability.

In addition, $R_1$ and $R_2$ may be the same as each other. That is, the same phenolic compounds may be bonded to both ends of Formula 1 above, and the compound represented by Formula 1 may have improved dispersibility.

According to one embodiment of the present disclosure, n in Formula 1 may be an integer ranging from 1 to 50, specifically an integer ranging from 1 to 45, an integer ranging from 5 to 40, an integer ranging from 10 to 35, an integer ranging from 15 to 30, an integer ranging from 20 to 25, an integer ranging from 1 to 20, an integer ranging from 2 to 15, an integer ranging from 3 to 10, an integer ranging from 4 to 7, an integer ranging from 15 to 40, an integer ranging from 20 to 35, an integer ranging from 25 to 30, an integer ranging from 30 to 50, or an integer ranging from 35 to 45. Wherein n in Formula 1 is within the above-described range, the compound represented by Formula 1 may have excellent curing performance.

According to one embodiment of the present disclosure, the compound represented by Formula 1 may include at least one of compounds represented by the following Formulas 1-1 to 1-4:

[Formula 1-1]

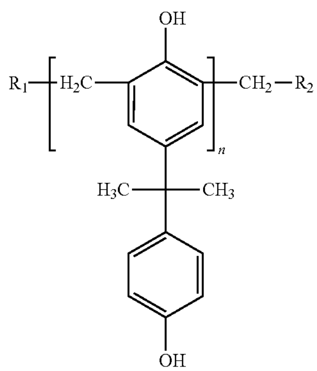

[Formula 1-2]

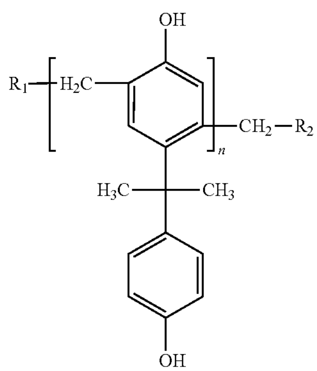

[Formula 1-3]

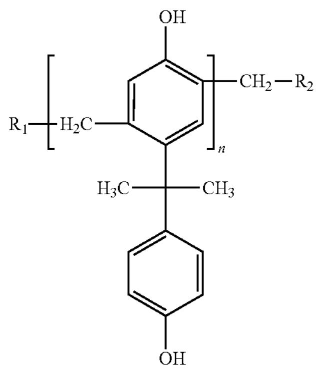

-continued

[Formula 1-4]

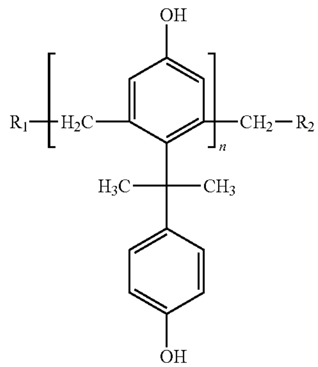

Specifically, the compound represented by Formula 1 may be the compound represented by Formula 1-1. The compound having the structure represented by Formula 1-1 may effectively reduce the hardness of a cured product of the adhesive composition for a semiconductor device, while having excellent curing performance.

According to one embodiment of the present disclosure, the compound represented by Formula 2 may be end-capped with $R_3$ and $R_4$. $R_3$ and $R_4$ may be each independently a phenolic compound. Where $R_3$ and $R_4$ are each independently a phenolic compound, the hardness of the curing agent itself may be reduced, so that a cured product of the adhesive composition for a semiconductor device containing the curing agent may have increased softness. Thereby, the adhesive composition for a semiconductor device may provide an adhesive film having excellent adhesive performance and excellent crack resistance.

In addition, $R_3$ and $R_4$ may be the same as each other. That is, the same phenolic compounds may be bonded to both ends of Formula 2 above, and the compound represented by Formula 2 may have improved dispersibility.

According to one embodiment of the present disclosure, kin Formula 2 may be an integer ranging from 1 to 50, specifically an integer ranging from 1 to 45, an integer ranging from 5 to 40, an integer ranging from 10 to 35, an integer ranging from 15 to 30, an integer ranging from 20 to 25, an integer ranging from 1 to 20, an integer ranging from 2 to 15, an integer ranging from 3 to 10, an integer ranging from 4 to 7, an integer ranging from 15 to 40, an integer ranging from 20 to 35, an integer ranging from 25 to 30, an integer ranging from 30 to 50, or an integer ranging from 35 to 45. Wherein k in Formula 2 is within the above-described range, the compound represented by Formula 2 may have excellent curing performance.

According to one embodiment of the present disclosure, the compound represented by Formula 2 may include at least one of compounds represented by the following Formulas 2-1 to 2-4:

[Formula 2-1]

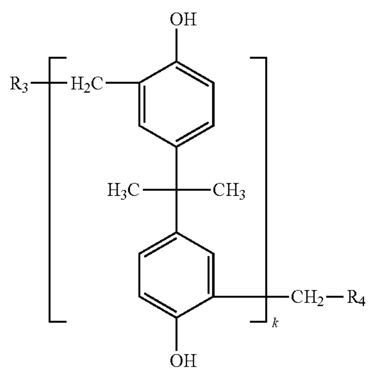

[Formula 2-2]

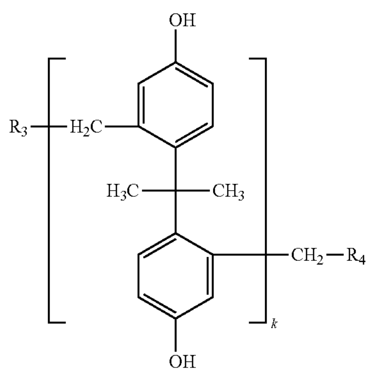

[Formula 2-3]

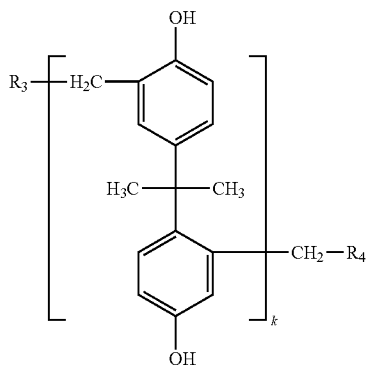

[Formula 2-4]

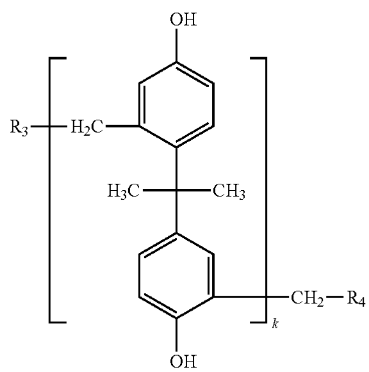

Specifically, the compound represented by Formula 2 may be the compound represented by Formula 2-1. The compound having the structure represented by Formula 2-1 may effectively reduce the hardness of a cured product of the adhesive composition for a semiconductor device, while having excellent curing performance.

According to one embodiment of the present disclosure, the curing agent may at least include the compound represented by Formula 2-1. As described above, the compound having the structure represented by Formula 2-1 may effectively reduce the hardness of a cured product of the adhesive composition for a semiconductor device, while having excellent curing performance, thereby effectively improving the crack resistance and reliability of the adhesive film.

According to one embodiment of the present disclosure, the curing agent may at least include the compound represented by Formula 1-1 and the compound represented by Formula 2-1. As described above, the compound represented by Formula 1-1 and the compound represented by Formula 2-1 may effectively reduce the hardness of a cured product of the adhesive composition for a semiconductor device, while having excellent curing performance.

According to one embodiment of the present disclosure, the phenolic compound may be monocyclic. That is, $R_1$, $R_2$, $R_3$ and $R_4$ may each independently be a monocyclic phenolic compound. Where $R_1$, $R_2$, $R_3$ and $R_4$ are each independently a monocyclic phenolic compound, the hardness of each of the compound represented by Formula 1 and the compound represented by Formula 2 may be effectively reduced. That is, the adhesive composition for a semiconductor device containing the curing agent may be effectively inhibited from cracking that may occur during a thermal compression bonding process, while having excellent adhesive strength.

According to one embodiment of the present disclosure, the phenolic compound may be a phenol group unsubstituted or substituted with at least one of a linear or branched alkyl group having 1 to 10 carbon atoms and an alicyclic alkyl group having 4 to 10 carbon atoms. Specifically, the phenolic compound may be an unsubstituted phenol group. Alternatively, the phenolic compound may be a phenol group substituted with at least one alkyl group. Specifically, the phenolic compound may be a phenol group substituted with at least one of a linear or branched aliphatic alkyl group and an alicyclic alkyl group.

As the above-described kind of phenolic compound is bonded to each of the ends of the compound represented by Formula 1 and the compound represented by Formula 2, the compound represented by Formula 1 and the compound represented by Formula 2 may exhibit excellent curing performance while having appropriate softness.

According to one embodiment of the present disclosure, the number of carbon atoms in the linear or branched alkyl group as a substituent of the phenol group may be 1 to 10, 1 to 8, 1 to 6, 1 to 5, 1 to 4, 1 to 3, 1 to 2, 2 to 4, 3 to 5, or 4 to 6. Where the number of carbon atoms in the linear or branched alkyl group is within the above-described range, the hardness of each of the compound represented by Formula 1 and the compound represented by Formula 2 may be effectively reduced. The linear or branched alkyl group may be methyl, ethyl, n-propyl, isopropyl, n-butyl, 2-methylpropyl, n-pentyl, 2-methylbutyl, 3-methylbutyl, 2-ethylpropyl, n-hexyl, 2-methylpentyl, 3-methylpentyl, 4-methylpentyl or 2-ethylbutyl, but the type of the alkyl group is not limited thereto.

According to one embodiment of the present disclosure, the number of carbon atoms in the alicyclic alkyl group as a substituent of the phenol group may be 4 to 10, 4 to 8, 5 to 8, or 6 to 8. Where the number of carbon atoms in the alicyclic alkyl group is within the above-described range, the hardness of each of the compound represented by Formula 1 and the compound represented by Formula 2 may be effectively reduced. The alicyclic alkyl group may be cyclobutyl, cyclopentyl, cyclohexyl, cycloheptyl, or cyclooctyl, but the type of the alkyl group is not limited thereto.

According to one embodiment of the present disclosure, the number of the alkyl groups as substituents of the phenol group may be 1 to 3, or 1 or 2. Where the number of the alkyl groups as substituents of the phenol group is within the above-described range, the softness of the curing agent may be effectively increased while the curing performance of the curing agent is prevented from deteriorating.

According to one embodiment of the present disclosure, the phenolic compound may be any one of the following compounds:

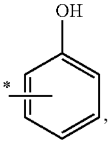,
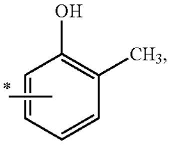,
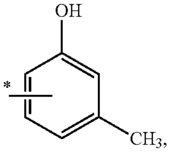,
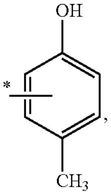,
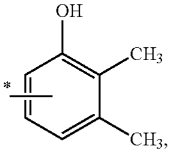,
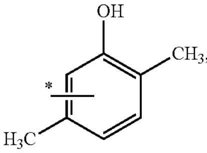,
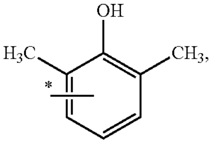,
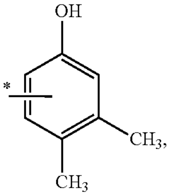,
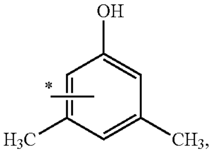, Specifically, the phenolic compound may be any one of the following compounds:

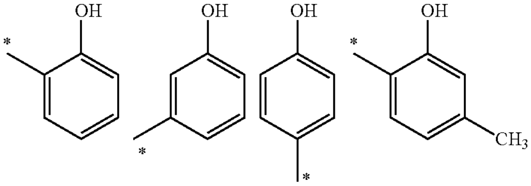
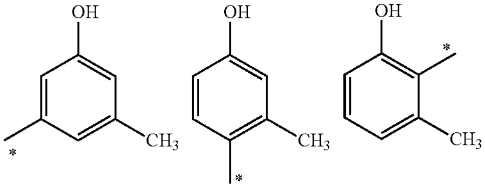
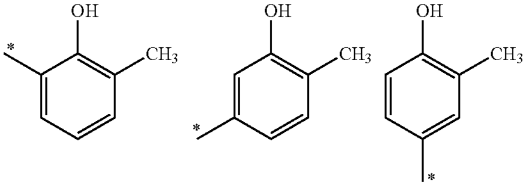
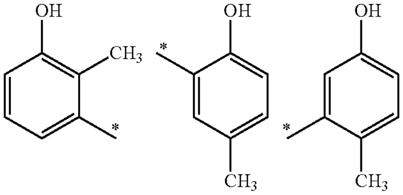
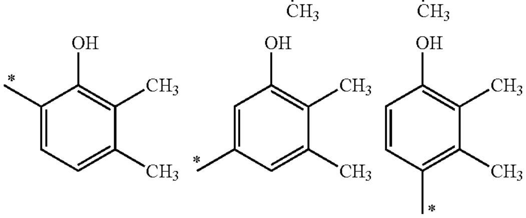
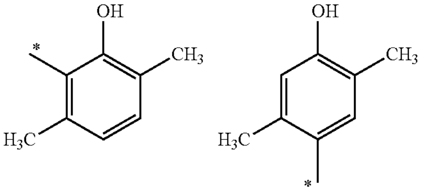
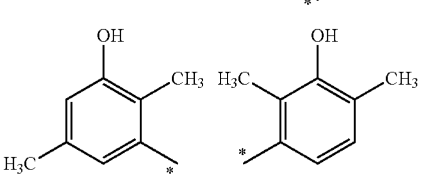
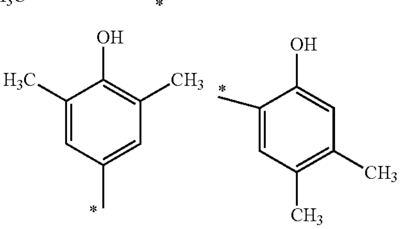

-continued

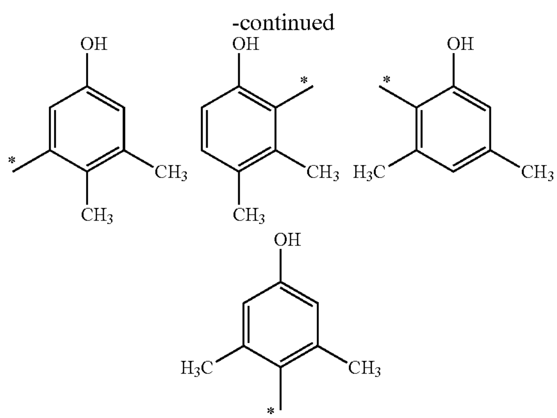

wherein "*" refers to a bonding site.

Where the phenolic compound is any one of the above compounds, the hardness of each of the compound represented by Formula 1 and the compound represented by Formula 2 may be effectively reduced while the excellent curing performance thereof is maintained. Thereby, the adhesive composition for a semiconductor device containing the curing agent may provide an adhesive film for a semiconductor device having excellent adhesive performance and crack resistance.

According to one embodiment of the present disclosure, the compound represented by Formula 1 may include at least one of a compound represented by the following Formula 1-A and a compound represented by the following Formula 1-B:

[Formula 1-A]

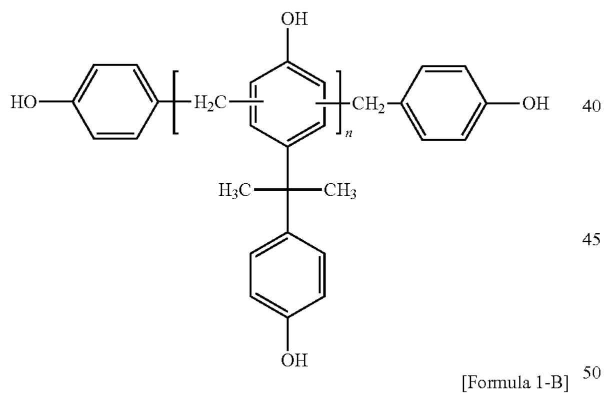

[Formula 1-B]

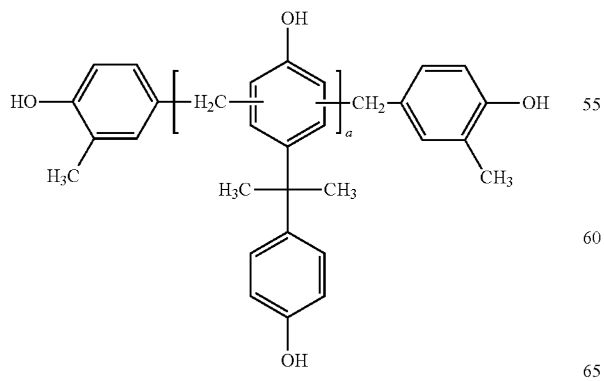

wherein n is an integer ranging from 1 to 50.

The hardness of each of the compound represented by Formula 1-A and the compound represented by Formula 1-B may be effectively reduced, so that an adhesive composition for a semiconductor device may have improved crack resistance and may have curing performance capable of achieving excellent mechanical properties.

According to one embodiment of the present disclosure, the compound represented by Formula 1-A may include the following compound 1-A-1, and the compound represented by Formula 1-B may include the following compound 1-B-1:

[Compound 1-A-1]

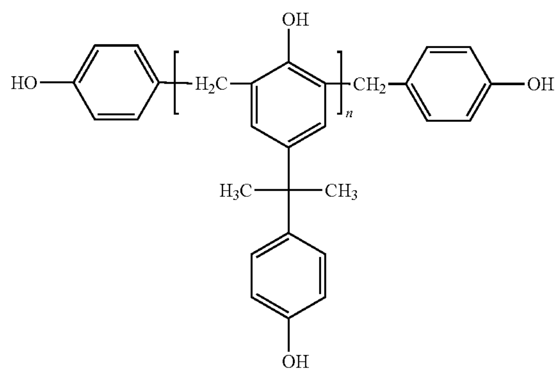

[Compound 1-B-1]

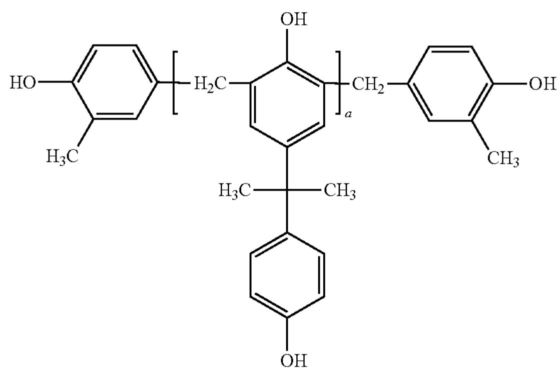

wherein n is an integer ranging from 1 to 50.

According to one embodiment of the present disclosure, the compound represented by Formula 2 may include at least one of a compound represented by the following Formula 2-A and a compound represented by the following Formula 2-B:

[Formula 2-A]

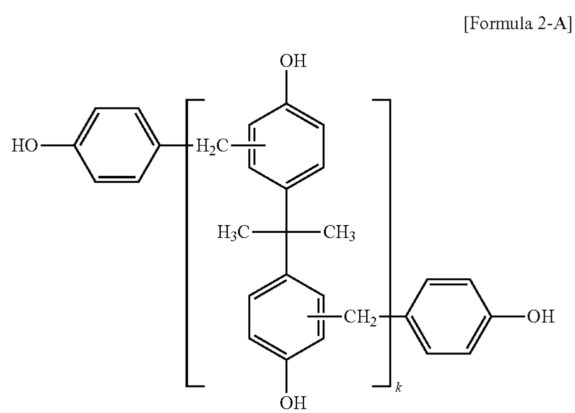

[Formula 2-B]

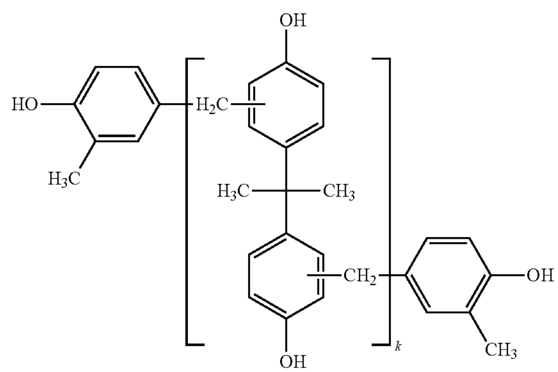

wherein k is an integer ranging from 1 to 50.

The adhesive composition for a semiconductor device containing the compound represented by Formula 2-A and the compound represented by Formula 2-B may provide an adhesive film for a semiconductor device having excellent adhesive performance and crack resistance.

According to one embodiment of the present disclosure, the compound represented by Formula 2-A may include the following compound 2-A-1, and the compound represented by Formula 2-B may include the following compound 2-B-1:

[Compund 2-A-1]

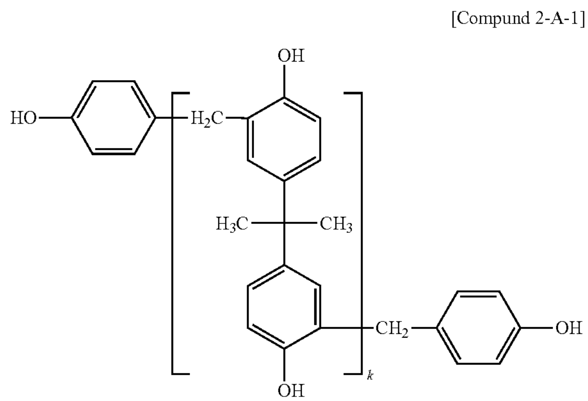

-continued

[Compund 2-B-1]

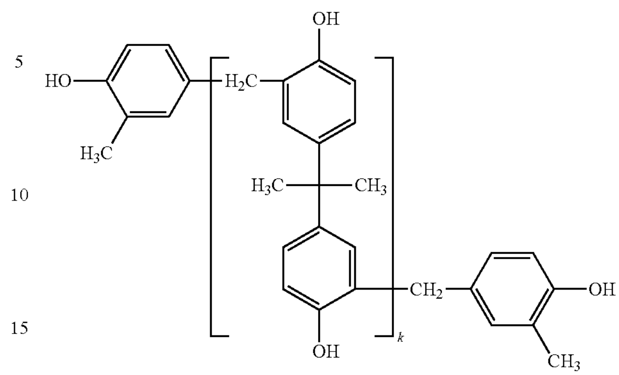

wherein n is an integer ranging from 1 to 50.

According to one embodiment of the present disclosure, the content of the curing agent may be 5 parts by weight to 195 parts by weight based on 100 parts by weight of the thermosetting resin. Specifically, the content of the curing agent may be 5 parts by weight to 190 parts by weight, 10 parts by weight to 150 parts by weight, 20 parts by weight to 130 parts by weight, 30 parts by weight to 110 parts by weight, 40 parts by weight to 100 parts by weight, 50 parts by weight to 80 parts by weight, 5 parts by weight to 100 parts by weight, 5 parts by weight to 95 parts by weight, 5 parts by weight to 85 parts by weight, 5 parts by weight to 80 parts by weight, 5 parts by weight to 75 parts by weight, 5 parts by weight to 70 parts by weight, 5 parts by weight to 50 parts by weight, 5 parts by weight to 25 parts by weight, 5 parts by weight to 10 parts by weight, 60 parts by weight to 195 parts by weight, 65 parts by weight to 190 parts by weight, 75 parts by weight to 190 parts by weight, 90 parts by weight to 190 parts by weight, 100 parts by weight to 190 parts by weight, 125 parts by weight to 190 parts by weight, 150 parts by weight to 190 parts by weight, or 170 parts by weight to 190 parts by weight, based on 100 parts by weight of the thermosetting resin.

Where the content of the curing agent is controlled within to the above-described range, it is possible to further improve the crack resistance of the adhesive film for a semiconductor device by lowering the hardness of a cured product of the adhesive composition for a semiconductor device. In addition, where the content of the curing agent is within the above-described range, a cured product of the adhesive composition for a semiconductor device may have improved heat resistance, strength and adhesive properties.

According to one embodiment of the present disclosure, the curing agent may further include at least one of an amine-based compound, an acid anhydride-based compound, and an amide-based compound. Specifically, the amine-based compound may be one selected from the group consisting of diaminodiphenylmethane, diethylenetriamine, triethylenetriamine, diaminodiphenylsulfone, isophoronediamine, or combinations thereof. The acid anhydride-based compound may be one selected from the group consisting of phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, methylhexahydrophthalic anhydride, or combinations thereof. Examples of the amide-based compound include dicyandiamide and a polyamide resin synthesized from a linoleic acid dimer and ethylenediamine. Where the curing agent further includes the above-described compounds, an adhesive film for a semiconductor device formed from the adhesive composition for a semiconductor device may have improved mechanical properties.

According to one embodiment of the present disclosure, the thermosetting resin may include at least one of a solid epoxy resin and a liquid epoxy resin. The thermosetting resin may exhibit heat resistance or mechanical strength by reaction with the curing agent.

According to one embodiment of the present disclosure, the epoxy resin may include at least one of cresol novolac epoxy resin, bisphenol F-type epoxy resin, bisphenol F-type novolac epoxy resin, bisphenol A-type epoxy resin, bisphenol A-type novolac epoxy resin, phenol novolac epoxy resin, tetrafunctional epoxy resin, biphenyl type epoxy resin, biphenyl type novolak epoxy resin, triphenol methane type epoxy resin, alkyl-modified triphenol methane epoxy resin, naphthalene type epoxy resin, dicyclopentadiene type epoxy resin, dicyclopentadiene-modified phenol type epoxy resin, glycidylamine type epoxy resin, and cycloaliphatic epoxy resin. When the thermosetting resin includes the above-described epoxy resin, the adhesive composition for a semiconductor device may provide an adhesive film for a semiconductor device having physical properties, heat resistance and mechanical properties such as impact resistance, which are suitable for a package having a structure in which semiconductor chips are stacked in multiple stages.

According to one embodiment of the present disclosure, the epoxy resin may have an average epoxy equivalent weight of 100 to 1,000. The average epoxy equivalent weight may be determined based on the weight ratio and epoxy equivalent weight of each epoxy resin contained in the epoxy resin.

According to one embodiment of the present disclosure, the thermoplastic resin may include at least one of polyimide-based resin, polyether imide-based resin, polyester imide-based resin, polyamide-based resin, polyether sulfone-based resin, polyether ketone-based resin, polyolefin-based resin, polyvinyl chloride-based resin, phenoxy-based resin, butadiene rubber, styrene-butadiene rubber, modified butadiene rubber, reactive butadiene acrylonitrile copolymer rubber, and (meth)acrylate-based resin. Where the thermoplastic resin is selected from among those described above, it is possible to increase the compatibility of thermoplastic resin with the epoxy resin and reduce stress occurring in a semiconductor package.

According to one embodiment of the present disclosure, the thermoplastic resin may include a (meth)acrylate-based resin having a glass transition temperature of −10° C. to 30° C. and a weight-average molecular weight of 50,000 g/mol to 1,000,000 g/mol.

According to one embodiment of the present disclosure, the (meth)acrylate-based resin may be an epoxy group-containing acrylic copolymer which may contain glycidyl acrylate or glycidyl methacrylate in an amount of 1 wt % to 30 wt %, 2 wt % to 28 wt %, or 2.5 wt % to 25 wt %, based on the total weight thereof. Where the content of the epoxy group in the (meth)acrylate-based resin is within the above-described range, the (meth)acrylate-based resin may have excellent compatibility with the epoxy resin and excellent adhesive strength. In addition, the rate of increase in viscosity by curing may be appropriate, and thus bonding and embedding of solder bumps in a process for thermal compression bonding of semiconductor devices may be sufficiently achieved.

According to one embodiment of the present disclosure, the content of the thermoplastic resin may be 5 parts by weight to 350 parts by weight based on 100 parts by weight of the thermosetting resin. Specifically, the content of the thermoplastic resin may be 10 parts by weight to 300 parts by weight, 25 parts by weight to 275 parts by weight, 50 parts by weight to 250 parts by weight, 75 parts by weight to 200 parts by weight, 100 parts by weight to 150 parts by weight, 5 parts by weight to 200 parts by weight, 10 parts by weight to 175 parts by weight, 25 parts by weight to 150 parts by weight, 50 parts by weight to 125 parts by weight, 70 parts by weight to 100 parts by weight, 150 parts by weight to 300 parts by weight, 180 parts by weight to 275 parts by weight, 200 parts by weight to 250 parts by weight, 250 parts by weight to 350 parts by weight, 275 parts by weight to 325 parts by weight, or 290 parts by weight to 310 parts by weight, based on 100 parts by weight of the thermosetting resin. Where the content of the thermoplastic resin is controlled within the above-described range, it is possible to increase the compatibility of thermoplastic resin with the thermosetting resin and effectively reduce stress occurring in a semiconductor package.

According to one embodiment of the present disclosure, the adhesive composition for a semiconductor device may further contain an inorganic filler and a curing catalyst.

According to one embodiment of the present disclosure, the inorganic filler may include at least one of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate. Where the above type of inorganic filler is used, it is possible to effectively improve the mechanical properties of the adhesive film for a semiconductor device.

According to one embodiment of the present disclosure, the content of the inorganic filler may be 5 parts by weight to 200 parts by weight based on 100 parts by weight of the thermosetting resin. Specifically, the content of the inorganic filler may be 10 parts by weight to 180 parts by weight, 20 parts by weight to 150 parts by weight, 30 parts by weight to 120 parts by weight, 50 parts by weight to 100 parts by weight, 75 parts by weight to 85 parts by weight, 5 parts by weight to 100 parts by weight, 15 parts by weight to 80 parts by weight, 30 parts by weight to 60 parts by weight, 80 parts by weight to 150 parts by weight, 90 parts by weight to 135 parts by weight, 100 parts by weight to 115 parts by weight, 125 parts by weight to 200 parts by weight, 140 parts by weight to 180 parts by weight, or 150 parts by weight to 175 parts by weight, based on 100 parts by weight of the thermosetting resin. Where the content of the inorganic filler is within the above-described range, the mechanical properties of the adhesive film for a semiconductor device, which is formed using the adhesive composition for a semiconductor device, may be improved, and the mismatch of the coefficient of thermal expansion between the adhesive film and a semiconductor chip may be reduced, which makes it possible to improve reliability.

According to one embodiment of the present disclosure, the average particle diameter (based on the longest outer diameter) of the inorganic filler may be 0.01 μm to 10 μm, specifically 0.02 μm to 5 μm, or 0.03 μm to 2 μm. Where the average particle diameter of the inorganic filler is within the above-described range, the inorganic filler may be prevented from being aggregated in the adhesive composition for a semiconductor device. In addition, where the average particle diameter of the inorganic filler is within the above-described range, it is possible to suppress damage to a semiconductor circuit or deterioration in the adhesive property of the adhesive film for a semiconductor device from being caused by the inorganic filler.

According to one embodiment of the present disclosure, the curing catalyst may serve to accelerate the action of the curing agent or the curing of the adhesive composition for a semiconductor device. The curing catalyst may include at least one of a phosphorus-based compound, a boron-based compound, a phosphorus-boron-based compound, and an imidazole-based compound. However, the type of the curing catalyst is not limited thereto, and any curing catalyst may be used without limitation as long as it is a curing catalyst known to be used in the production of an adhesive film for a semiconductor device and the like.

According to one embodiment of the present disclosure, the content of the curing catalyst may be 0.1 parts by weight to 20 parts by weight based on 100 parts by weight of the thermosetting resin. Specifically, the content of the curing catalyst may be 0.5 parts by weight to 18 parts by weight, 1 part by weight to 15 parts by weight, 2.5 parts by weight to 12.5 parts by weight, or 5 parts by weight to 10 parts by weight, based on 100 parts by weight of the thermosetting resin. Where the content of the curing catalyst is controlled within the above-described range, it is possible to effectively accelerate the curing reaction of the adhesive composition for a semiconductor device.

According to one embodiment of the present disclosure, the adhesive composition for a semiconductor device may, if necessary, further contain a leveling agent, a dispersing agent, or a solvent.

According to one embodiment of the present disclosure, the solvent may be used for the purpose of dissolving the adhesive composition for a semiconductor device and imparting a viscosity suitable for applying the composition. Specific examples of the solvent include ketones such as methyl ethyl ketone and cyclohexanone; aromatic hydrocarbons such as toluene, xylene, and tetramethylbenzene; glycol ethers (cellosolves) such as ethylene glycol monoethyl ether, ethylene glycol monomethyl ether, ethylene glycol monobutyl ether, diethylene glycol monoethyl ether, diethylene glycol monomethyl ether, diethylene glycol monobutyl ether, propylene glycol monomethyl ether, propylene glycol monoethyl ether, dipropylene glycol diethyl ether, and triethylene glycol monoethyl ether; acetic acid esters such as ethyl acetate, butyl acetate, ethylene glycol monoethyl ether acetate, ethylene glycol monobutyl ether acetate, diethylene glycol monoethyl ether acetate, and dipropylene glycol monomethyl ether acetate; alcohols such as ethanol, propanol, ethylene glycol, propylene glycol, and carbitol; aliphatic hydrocarbons such as octane and decane; petroleum-based solvents such as petroleum ether, petroleum naphtha, hydrogenated petroleum naphtha, and solvent naphtha; and amides such as dimethylacetamide and dimethylformamide (DMF). These solvents may be used alone or as a mixture of two or more thereof.

The solvent may be used in an appropriate amount in consideration of the dispersibility, solubility or viscosity of the adhesive composition for a semiconductor device. For example, the adhesive composition for a semiconductor device may contain 0.1 wt % to 70 wt %, or 1 wt % to 65 wt %, of the solvent. Where the content of the solvent is within the above-described range, the coatability of the adhesive composition for a semiconductor device may be improved, and the drying of the adhesive composition for a semiconductor device may be facilitated, which makes it possible to reduce the stickiness of the produced film.

Meanwhile, examples of a method for preparing the adhesive composition for a semiconductor device are not particularly limited, and various methods, for example, a method of mixing the above-described components together using a mixer, etc. may be used.

One embodiment of the present disclosure provides an adhesive film for a semiconductor device including a cured product of the adhesive composition for a semiconductor device.

The adhesive film for a semiconductor device according to one embodiment of the present disclosure may have excellent adhesive strength, and may be effectively inhibited from cracking during the thermal compression bonding process. That is, the adhesive film for a semiconductor device, produced from the above-described adhesive composition for a semiconductor device containing: the thermosetting resin; the thermoplastic resin; and the curing agent including at least one of the compound represented by Formula 1 and the compound represented by Formula 2, may have excellent adhesive performance and crack resistance.

According to one embodiment of the present disclosure, the adhesive film for a semiconductor device refers to a fully cured film obtained through processes of applying, drying and curing the above-described adhesive composition for a semiconductor device, and a polymer included in the adhesive film for a semiconductor device may include a reaction product obtained through a crosslinking reaction of the components contained in the adhesive composition for a semiconductor device.

The application step may be performed using a conventional method and device known to be used to apply the adhesive composition for a semiconductor device. For example, the adhesive composition for a semiconductor device may be applied onto a substrate film using a comma coater, a blade coater, a lip coater, a rod coater, a squeeze coater, a reverse coater, a transfer roll coater, a gravure coater or a spray coater as it is or after being diluted in an appropriate organic solvent. After application, the adhesive composition may be dried.

According to one embodiment of the present disclosure, the drying temperature may be 50° C. to 200° C. Specifically, the drying temperature may be 60° C. to 170° C., or 70° C. to 150° C. In addition, the drying time may be 2 minutes to 30 minutes. Specifically, the drying time may be 2.5 minutes to 25 minutes, 3 minutes to 20 minutes, or 3.5 minutes to 15 minutes.

According to one embodiment of the present disclosure, as a supporting substrate for supporting the adhesive film for a semiconductor device, there may be used a resin film having excellent heat resistance or chemical resistance, a crosslinked film obtained by crosslinking a resin constituting the resin film, or a release-treated film obtained by applying a silicone resin or the like to the surface of the resin film.

According to one embodiment of the present disclosure, as the resin constituting the resin film, there may be used polyolefin such as polyester, polyethylene, polypropylene, polybutene, or polybutadiene, vinyl chloride, an ethylene-methacrylic acid copolymer, an ethylene vinyl acetate copolymer, polyester, polyimide, polyethylene terephthalate, polyamide, polyurethane, etc.

According to one embodiment of the present disclosure, the thickness of the supporting substrate is not particularly limited, but may be 3 to 400 μm, or 5 to 200 μm, or 10 to 150 μm.

According to one embodiment of the present disclosure, an adhesive layer may be interposed between the supporting substrate and the adhesive film for a semiconductor device. As the adhesive layer, one known in the art may be applied without particular limitation.

One embodiment of the present disclosure provides a semiconductor package including the adhesive film for a semiconductor device.

The semiconductor package according to one embodiment of the present disclosure may have excellent quality. Specifically, since the adhesive film for a semiconductor device may have excellent adhesive strength and may be prevented from cracking, the semiconductor package including the adhesive film for a semiconductor device may have excellent quality and reliability.

The adhesive film for a semiconductor device may be used for bonding a semiconductor device, and the semiconductor device may include a circuit board and semiconductor chips. Examples of the circuit board include a printed circuit board (PCB), a semiconductor package board, or a flexible printed circuit board (FPCB).

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Hereinafter, the present disclosure will be described in detail with reference to examples.

Production Example 1

150 g of bisphenol A and 14 g of formaldehyde were dissolved in 750 ml of 2-ethoxy ethanol in an oil bath, thus preparing a mixture. The prepared mixture was heated to 100° C., and 1.5 g of sulfuric acid was added thereto dropwise, thus preparing a mixture solution. Thereafter, the mixture solution was heated to 135° C. and allowed to react for 12 hours. After completion of the reaction, the water and solvent contained in the mixture solution were removed, and residual bisphenol A was removed through several washing operations, thus synthesizing a bisphenol A novolac compound.

For end-capping of the synthesized bisphenol A novolac compound with phenol, 2.8 g of formaldehyde and 57 g of phenol were added to 150 g of the synthesized bisphenol A novolac compound to prepare a mixture. The prepared mixture was dissolved in 750 ml of 2-ethoxy ethanol in an oil bath, thus preparing a mixture solution. Thereafter, the prepared mixture solution was heated to 100° C., 0.3 g of sulfuric acid was added thereto dropwise and mixed therewith, and then heated to 135° C. and stirred for 12 hours. After completion of the reaction, the solvent contained in the mixture solution was removed, and several washing operations were performed. Finally, a phenol end-capped bisphenol A novolak resin including the following Compound 1-A-1 and the following Compound 2-A-1 was obtained. At this time, the obtained bisphenol A novolac resin mainly included the following Compound 2-A-1, and the softening point thereof was about 130° C.

[Compound 1-A-1]

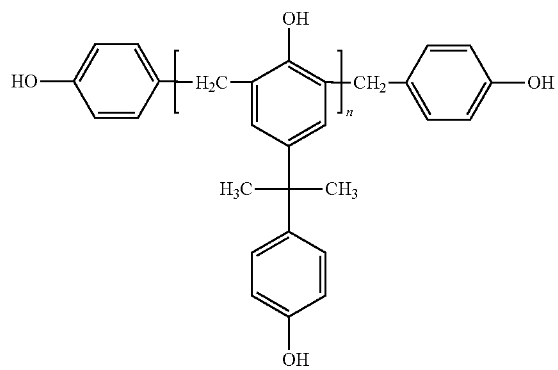

[Compound 1-B-1]

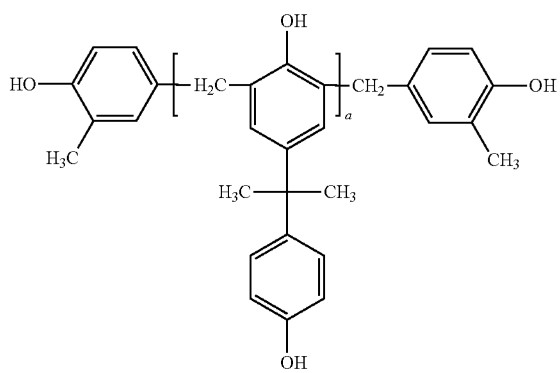

n in Compound 1-A-1 was about 4 to 7, and kin Compound 2-A-1 was about 4 to 7.

Production Example 2

A bisphenol A novolak compound was synthesized in the same manner as in Production Example 1. Thereafter, an o-cresol end-capped bisphenol A novolak resin including the following Compound 1-B-1 and the following Compound 2-B-1 was obtained in the same manner as in Production Example 1, except that 69 g of o-cresol was added instead of phenol. At this time, the obtained bisphenol A novolac resin mainly included the following Compound 2-B-1.

[Compound 1-B-1]

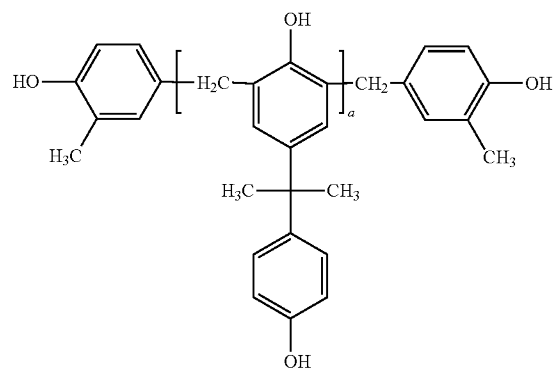

-continued

[Compund 2-B-1]

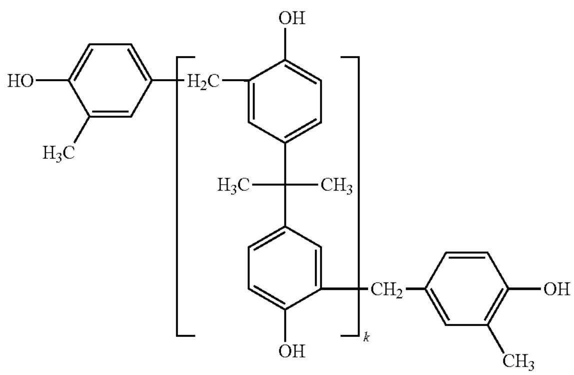

n in Compound 1-B-1 was about 4 to 7, and kin Compound 2-B-1 was about 4 to 7.

Examples and Comparative Examples (Production of Adhesive Composition for Semiconductor Device and Adhesive Film for Semiconductor Device)

Example 1

(1) Production of Adhesive Composition for Semiconductor Device 72 g of liquid epoxy resin (RE-3105, Nippon Kayaku Co., Ltd., bisphenol A epoxy resin, epoxy equivalent weight: 180 g/eq.) and 10 g of solid epoxy resin (EOCN-1045, Nippon Kayaku Co., Ltd., epoxy equivalent weight: 218 g/eq.) were mixed together to prepare a thermosetting resin. In addition, as a thermoplastic resin, the acrylate resin KG-3015 (Mw: 900,000, glass transition temperature: 10° C., solid content: 15%; a product dissolved in methyl ethyl ketone) was prepared, and as a curing agent, the phenol end-capped bisphenol A novolac resin produced in Production Example 1 was prepared. In addition, an inorganic filler (YA050C, Admatech, spherical silica, average particle diameter: about 50 nm) and an imidazole-based curing catalyst (C11Z-CNZ, Curezol, SHIKOKU) were prepared, and methyl ethyl ketone was prepared as a solvent.

Thereafter, the prepared thermosetting resin, thermoplastic resin, curing agent, inorganic filler, curing catalyst and solvent were mixed together to obtain an adhesive composition (solid content: 40 wt %) for a semiconductor device. At this time, based on 100 parts by weight of the thermosetting resin, about 37 parts by weight of the thermoplastic resin, about 68 parts by weight of the curing agent, about 152 parts by weight of the inorganic filler, and about 2.2 parts by weight of the curing catalyst were mixed together.

(2) Production of Adhesive Film for Semiconductor Device

The adhesive composition for a semiconductor device was applied onto a release-treated PET film to a thickness of about 80 μm using a doctor blade, dried in a lab oven at 110° C. at an air speed of 1,000 rpm for 5 minutes, and then covered with a protective film, thus producing a 20 μm-thick adhesive film for a semiconductor device.

Example 2

An adhesive composition for a semiconductor device and an adhesive film for a semiconductor device were produced in the same manner as in Example 1, except that the cresol end-capped bisphenol A novolac resin produced in Production Example 2 was used as a curing agent.

Example 3

An adhesive composition for a semiconductor device and an adhesive film for a semiconductor device were produced in the same manner as in Example 1, except that the inorganic filler was not used.

Example 4

An adhesive composition for a semiconductor device and an adhesive film for a semiconductor device were produced in the same manner as in Example 1, except that phenoxy resin (Kukdo Chemical Co. Ltd., YP-50s) was used instead of the acrylate resin KG-3015 as the thermoplastic resin.

Example 5

An adhesive composition for a semiconductor device and an adhesive film for a semiconductor device were produced in the same manner as in Example 1, except that the content of the curing agent was controlled to about 5 parts by weight based on 100 parts by weight of the thermosetting resin.

Example 6

An adhesive composition for a semiconductor device and an adhesive film for a semiconductor device were produced in the same manner as in Example 1, except that the content of the curing agent was controlled to about 190 parts by weight based on 100 parts by weight of the thermosetting resin.

Comparative Example 1

An adhesive composition for a semiconductor device and an adhesive film for a semiconductor device were produced in the same manner as in Example 1, except that a bisphenol A novolac-type curing agent (KH-6021, DIC) was used as a curing agent.

Comparative Example 2

An adhesive composition for a semiconductor device and an adhesive film for a semiconductor device were produced in the same manner as in Example 1, except that the content of the curing agent was controlled to about 200 parts by weight based on 100 parts by weight of the thermosetting resin.

Comparative Example 3

An adhesive composition for a semiconductor device and an adhesive film for a semiconductor device were produced in the same manner as in Example 1, except that the content of the curing agent was controlled to about 3 parts by weight based on 100 parts by weight of the thermosetting resin.

Test Example 1 (Evaluation of Cracking)

A wafer was prepared, which included a bump chip (4.5 mm×4.5 mm), which was a semiconductor device in which lead-free solder was formed to a height of 3 μm on copper pillars having a height of 15 μm and a pitch of 50 μm.

The adhesive layer of the adhesive film for a semiconductor device produced in each of Examples 1 to 6 and Comparative Examples 1 to 3 was placed on the bump surface of the wafer and subjected to vacuum lamination at 60° C., and then the wafer was diced into individual chips.

The individual bump chips were subjected to thermal compression bonding to 6 mm×8 mm substrate chips having 50-μm-pitch bonding pads using a thermal compression bonder, thus preparing semiconductor devices. At this time, tack welding was performed with 50 N at a head temperature of 100° C. for 1 second, the head temperature was instantaneously raised to 280° C., and thermal compression bonding was performed with 100 N for 5 seconds.

A temperature cycle test was performed on the semiconductor devices produced as described above. First, it was confirmed by scanning acoustic tomography (SAT) that voids or cracks did not occur in the obtained semiconductor devices during thermal compression bonding. The temperature cycle test was performed under low-temperature and high-temperature conditions for 2,000 cycles, each consisting of −55° C. for 15 minutes, and then 125° C. for 15 minutes. After completion of the temperature cycle test, the semiconductor devices were observed by scanning acoustic tomography (SAT), and the section of the sample in which cracks or delamination was found was ground to confirm cracks. The sample in which cracks or delamination occurred was marked with X, and the sample in which cracks or delamination did not occur was marked with O.

Test Example 2 (Reliability Evaluation: Thermal Cycling Evaluation)

In the same manner as in Test Example 1, 10 semiconductor devices to which the adhesive films for a semiconductor device according to each of Examples 1 to 6 and Comparative Examples 1 to 3 were applied were prepared.

Thereafter, the thermal cycling tester was set to a temperature of −65° C. to 150° C., and 10 semiconductor devices were subjected to thermal cycling for 50 cycles, each consisting of exposure to the lowest temperature of −65° C. for 45 minutes, and then exposure to the highest temperature of 150° C. for 45 minutes, and the occurrence of delamination between the wafer and the adhesive film for a semiconductor device was evaluated. Specifically, after completion of the 500 cycles, the semiconductor devices were observed by scanning acoustic tomography (SAT), the case in which delamination did not occur in all the 10 semiconductor devices was evaluated as pass (O), and the case in which delamination occurred in at least one of the 10 semiconductor devices was evaluated as fail (X).

Table 1 below shows the measurement results obtained in Test Example 1 and Test Example 2.

TABLE 1

| | Crack evaluation | Reliability evaluation (TCT) |
|---|---|---|
| Example 1 | ○ | ○ |
| Example 2 | ○ | ○ |
| Example 3 | ○ | ○ |
| Example 4 | ○ | ○ |
| Example 5 | ○ | ○ |
| Example 6 | ○ | ○ |
| Comparative Example 1 | X | ○ |
| Comparative Example 2 | X | X |
| Comparative Example 3 | X | X |

Referring to Table 1 above, it was confirmed that the adhesive films for a semiconductor device according to Examples 1 to 6, in which the curing agent including the compound represented by Formula 1 and the compound represented by Formula 2 according to one embodiment of the present disclosure was used, showed excellent quality in crack evaluation and reliability evaluation, compared to the adhesive film for a semiconductor device according to Comparative Example 1 in which the bisphenol A novalac type curing agent was used as the curing agent.

Meanwhile, it was confirmed that Comparative Example 2, in which the content of the curing agent was 200 parts by weight based on 100 parts by weight of the thermosetting resin, and Comparative Example 3, in which the content of the curing agent was 3 parts by weight based on 100 parts by weight of the thermosetting resin, showed inferior quality in crack evaluation and reliability evaluation.

That is, it can be seen that the adhesive composition for a semiconductor device containing the curing agent according to one embodiment of the present disclosure may provide an adhesive film for a semiconductor device having excellent crack resistance and reliability.

The invention claimed is:

1. A curing agent comprising at least one of a compound represented by the following Formula 1 and a compound represented by the following Formula 2:

[Formula 1]

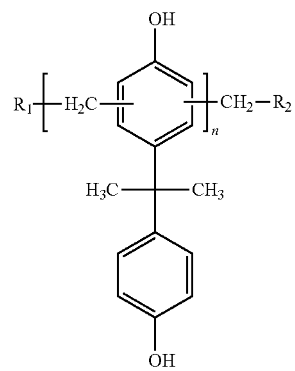

[Formula 2]

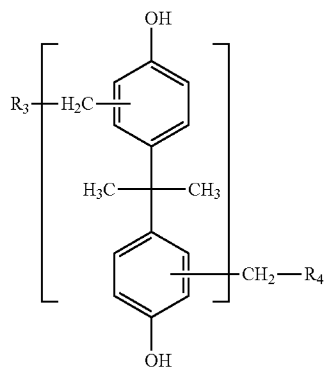

wherein $R_1$, $R_2$, $R_3$ and $R_4$ are each independently a phenolic group, n is an integer ranging from 1 to 50, and k is an integer ranging from 1 to 50, and wherein the phenolic group is monocyclic.

2. The curing agent of claim 1, comprising at least one compound represented by the following Formula 2-1:

[Formula 2-1]

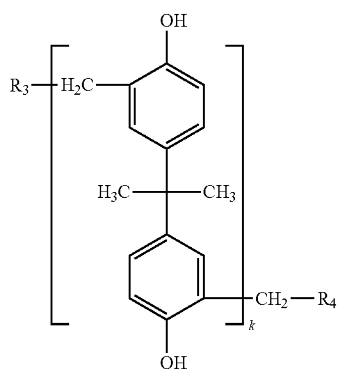

wherein $R_3$, $R_4$ and k are as defined for Formula 2.

3. The curing agent of claim 1, wherein the phenolic group is a phenol group unsubstituted or substituted with at least one of a linear or branched alkyl group having 1 to 10 carbon atoms and an alicyclic alkyl group having 4 to 10 carbon atoms.

4. The curing agent of claim 1, wherein the phenolic group is any one of the following groups:

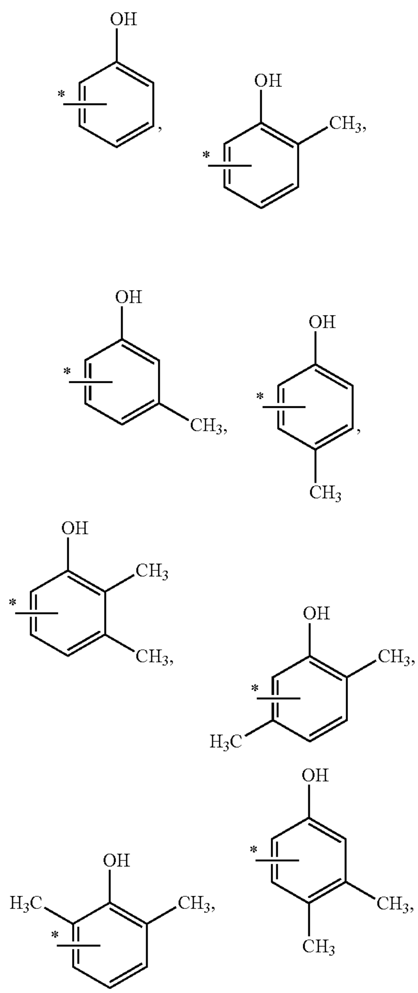

-continued

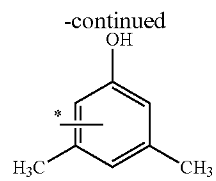

wherein '*' means a bonding site.

5. An adhesive composition for a semiconductor device containing:

a thermosetting resin;

a thermoplastic resin; and a curing agent comprising at least one of a compound represented by the following Formula 1 and a compound represented by the following Formula 2:

[Formula 1]

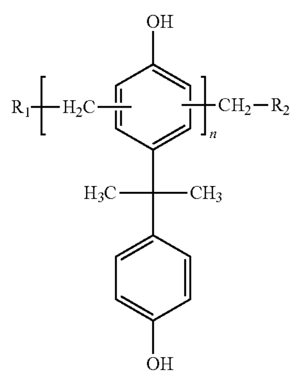

[Formula 2]

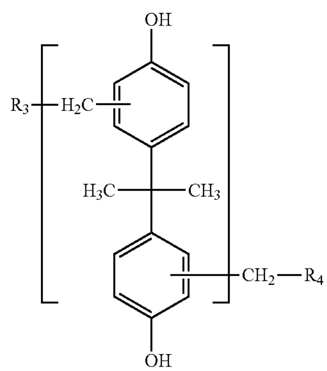

wherein $R_1$, $R_2$, $R_3$ and $R_4$ are each independently a phenolic group, n is an integer ranging from 1 to 50, and k is an integer ranging from 1 to 50, and wherein the phenolic group is monocyclic.

6. The adhesive composition of claim 5, wherein the curing agent comprises at least one compound represented by the following Formula 2-1:

[Formula 2-1]

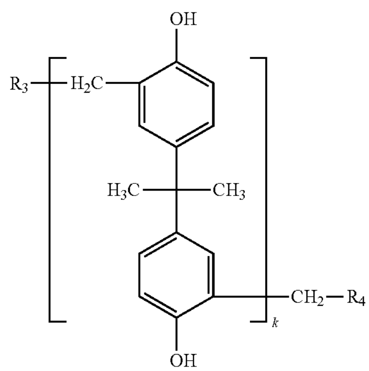

wherein $R_3$, $R_4$ and k are as defined in claim 5.

7. The adhesive composition of claim 5, wherein the phenolic group is a phenol group unsubstituted or substituted with at least one of a linear or branched alkyl group having 1 to 10 carbon atoms and an alicyclic alkyl group having 4 to 10 carbon atoms.

8. The adhesive composition of claim 5, wherein the phenolic group is any one of the following groups:

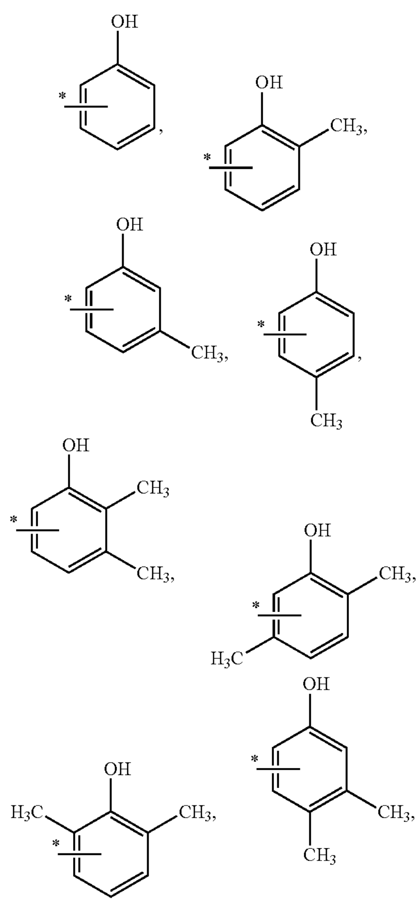

-continued

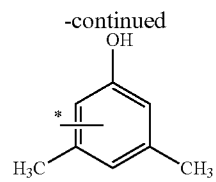

wherein "*" means a bonding site.

9. The adhesive composition of claim 5, wherein a content of the curing agent is 5 parts by weight to 195 parts by weight based on 100 parts by weight of the thermosetting resin.

10. The adhesive composition of claim 5, wherein the thermosetting resin comprises at least one of a solid epoxy resin and a liquid epoxy resin.

11. The adhesive composition of claim 5, wherein the thermoplastic resin comprises at least one of polyimide-based resin, polyether imide-based resin, polyester imide-based resin, polyamide-based resin, polyether sulfone-based resin, polyether ketone-based resin, polyolefin-based resin, polyvinyl chloride-based resin, phenoxy-based resin, butadiene rubber, styrene-butadiene rubber, modified butadiene rubber, reactive butadiene acrylonitrile copolymer rubber, and (meth)acrylate-based resin.

12. The adhesive composition of claim 5, wherein a content of the thermoplastic resin is 5 parts by weight to 350 parts by weight based on 100 parts by weight of the thermosetting resin.

13. The adhesive composition of claim 5, further comprising an inorganic filler and a curing catalyst.

14. The adhesive composition of claim 13, wherein the inorganic filler comprises at least one of alumina, silica, barium sulfate, magnesium hydroxide, magnesium carbonate, magnesium silicate, magnesium oxide, calcium silicate, calcium carbonate, calcium oxide, aluminum hydroxide, aluminum nitride, and aluminum borate.

15. The adhesive composition of claim 13, wherein a content of the inorganic filler is 5 parts by weight to 200 parts by weight based on 100 parts by weight of the thermosetting resin.

16. The adhesive composition of claim 13, wherein the curing catalyst comprises at least one of a phosphorus-based compound, a boron-based compound, a phosphorus-boron-based compound, and an imidazole-based compound.

17. The adhesive composition of claim 13, wherein a content of the curing catalyst is 0.1 parts by weight to 20 parts by weight based on 100 parts by weight of the thermosetting resin.

18. An adhesive film for a semiconductor device comprising a cured product of the adhesive composition for a semiconductor device according to claim 5.

19. A semiconductor package comprising the adhesive film for a semiconductor device according to claim 18.

* * * * *